Dec. 10, 1963 M. H. MacKENZIE 3,114,108

AUTOMATIC FREQUENCY CONTROL

Filed Jan. 11, 1962

INVENTOR,
MERLIN H. MACKENZIE

BY Jack H. Linscott

ATTORNEY

United States Patent Office 3,114,108

Patented Dec. 10, 1963

3,114,108

AUTOMATIC FREQUENCY CONTROL

Merlin H. MacKenzie, Mountain View, Calif., assignor to the United States of America as represented by the Secretary of the Army Filed Jan. 11, 1962, Ser. No. 166,007
4 Claims. (Cl. 325—321)

The present invention relates to an automatic frequency control (A.F.C.) circuit, and has particular utility in controlling the frequency of the local oscillator in a pulsed radar system.

More particularly, the A.F.C. circuit of this invention can remain locked onto a signal with a pulse spacing of much longer duration than is possible with prior art circuits, while still being able to achieve a fast sweep speed with a relatively low pulse repetition frequency (P.R.F.). It can be used in a radar system to prevent the loss of tracking when a target signal fails for a short time, as for example, in a radar system having a variable P.R.F., or in radar equipment operating from a moving vehicle where the possibility of incoming signal interruption is high.

Prior art A.F.C. systems have several disadvantages. Because of fixed circuit constants the "zero position" or steady state error is a function of the system pulse-repetition frequency. And, since the inherent "memory time" for holding the local oscillator frequency of such systems is only a few times the 1/P.R.F. value of the expected P.R.F., there must be a continual flow of received pulses to maintain the locked condition of the local oscillator frequency. Accordingly, if pulses are lost for a longer period than this memory time, the sweep action immediately resumes. These disadvantages often prevent the prior art A.F.C. systems from being used where the pulse-repetition rate may vary widely, from a few per second to several thousand per second, or where the pulse repetition rate is completely random.

Not only does the system to be described have circuit simplicity, and combines lock-on and sweep actions, but it also eliminates the disadvantages mentioned above, by separating the frequency memory function from the frequency correction function. This separation allows the frequency correction to take place at a rapid rate, as would be normal with a high pulse-repetition rate, yet permits the memory function to be adjustable to insure that the sweeping action will not commence at low pulse repetition rates.

Accordingly, the invention has the advantage of achieving:

(1) Greater performance reliability as a result of an extended memory time (greater probability of not losing A.F.C. lock); and (2) Less steady state error (ripple) in the local oscillator control voltages during the locked condition because of the relatively short correction time. It does this by utilizing a monostable flip-flop in conjunction with a clamping circuit to switch in either one of two separate circuit functions, frequency correction or frequency "memory."

Figure 1:
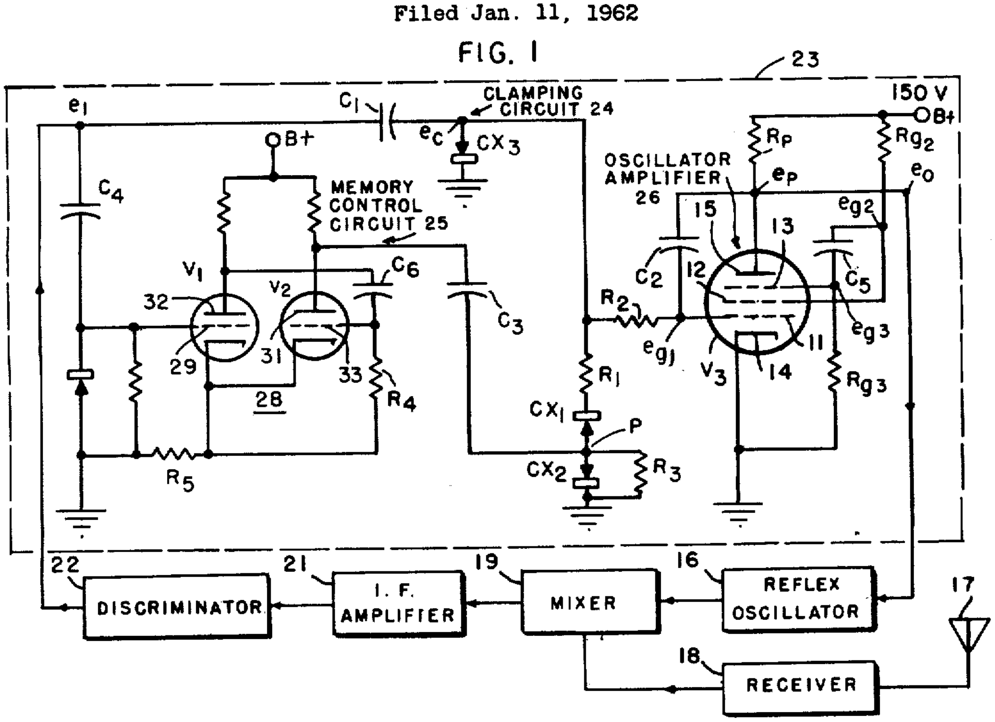
Figure 2:
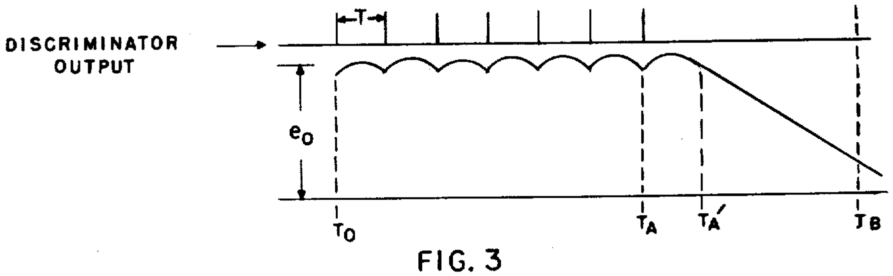
Figure 3:
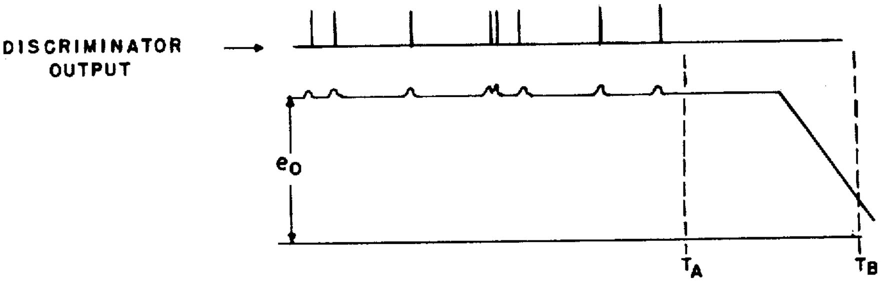

Other advantages and features of the invention will hereinafter become more fully apparent from consideration of the following specification taken in connection with the annexed drawings, in which:

FIGURE 1 is a schematic diagram of the preferred embodiment of the invention;

FIGURE 2 is a plot of the transitron output voltage $e_o$ as a function of time, shown with reference to the pulses from the discriminator, for a transitron circuit lacking the memory correction control circuit of this invention; and FIGURE 3 is a plot of the transitron output voltage $e_o$ as a function of time shown with reference to pulses from the discriminator but with the memory-correction control circuit of this invention in the system.

Although the invention will be described in connection with a radar system for controlling the frequency of a local oscillator of the velocity-modulated type, as, for example, a reflex-klystron, it is to be understood that the principle of the invention can be employed in any system wherein frequency determination is affected by applying a voltage to the oscillator or to a control circuit controlling the oscillator.

Referring now to the drawings, there are shown in FIGURE 1 a radar system utilizing A.F.C., typical parts being shown in block form. Radio frequency (R.F.) signals from antenna 17 are passed by receiver 18 to mixer 19 where they are combined with the output signal from reflex oscillator 16, which serves as the local oscillator of the radar system, to form a heterodyne signal at a desired intermediate frequency (I.F.). The I.F. signal is next coupled by I.F. amplifier 21 to a frequency control system comprising frequency discriminator 22, which has a pulse output proportional to the deviation of the I.F. signal from a desired mean value. The discriminator pulse output is fed to the A.F.C. circuit 23, consisting of tubes $V_1$, $V_2$ and $V_3$ and associated networks, where it is converted into a voltage which is coupled to the repeller electrode (not shown) of reflex oscillator 16 to control the oscillator frequency.

The A.F.C. network includes clamping circuit 24, comprising capacitor $C_1$, diode $CX_3$ and resistor $R_1$. This circuit clamps or stores voltage $e_1$, from pulse to pulse, applied to it from discriminator 22, as in the period $T_o$ to $T_a$ of FIGURE 2. (FIG. 2 represents the output voltage $e_o$ from transitron oscillator 26.) The clamped voltage $e_c$ is negative and is determined by the time between pulses (T) as well as by the values of $R_1$ and $C_1$. $R_1$ and $C_1$ are generally chosen to have a time constant equal to T. If a larger time constant is chosen, system instability could occur, and the system's ability to follow a variable frequency would be impaired. If too short a time constant is chosen, excessive inter-pulse frequency drift will occur. The negative clamped voltage $e_c$ is applied through resistor $R_2$ to control grid 11 of oscillator-amplifier circuit 26.

Oscillator-amplifier circuit 26, for example, a transitron oscillator, comprises pentode $V_3$ having control grid 11, screen grid 12, suppressor grid 13, cathode 14 and plate 15. D.C. supply voltage B+ is connected through plate resistor $R_p$ and screen grid resistor $R_{g2}$ to plate 15 and screen grid 12, respectively. Capacitor $C_2$ couples plate 15 to control grid 11, and capacitor $C_5$ couples suppressor grid 13 to screen grid 12. Suppressor resistor $R_{g3}$ connects suppressor grid 13 to ground. Cathode 14 is grounded. Plate 15 has its output applied to the repeller electrode (not shown) of reflex oscillator 16.

Transitron oscillator 26 can function either as a free-running sawtooth generator, to sweep the repeller potential throughout the tuning range, or as a D.C. amplifier to supply correction voltages to the repeller, depending on the potential on its control grid.

A brief description of the transitron oscillator operating as a free-running sawtooth voltage generator will be presented at this time to make the invention more readily understandable. Assume for the moment a plate current sufficient to cause a drop in plate resistor $R_p$ from the 150 volts of the supply voltage B+ to 100 volts on plate 15, and further assume a voltage $e_{g1}$ on control grid 11 approximately 10 volts negative. Under these conditions the cathode current divides 4 to 1 between plate 15 and screen 12, so that $R_{g2}$ holds the screen grid at nearly 150 volts. Suppressor grid 13 is at ground potential, and transitron 26 is ready to start the part of the cycle called linear plate rundown.

When this cycle begins, capacitor $C_2$ is charged to $e_p+e_g$, or 110 volts. As the charge leaks off capacitor $C_2$ through resistors $R_1$ and $R_2$ (assuming resistor $R_2$ is tied to ground through associated circuitry), the voltage $e_{g1}$ on control grid 11 becomes less negative. For this reason, the plate voltage drops at a rate determined by the values of resistors $R_1$ and $R_2$ and capacitor $C_2$. It is to be noted that resistor $R_1$ cooperates with both transitron 26 and clamping circuit 24. Now, as the plate voltage approaches ground potential, the grid voltage $e_{g1}$ increases slowly toward ground potential and more and more of the cathode current is diverted to screen 12, producing a drop in the screen potential $e_{g2}$ due to the current flowing through screen grid resistor $R_{g2}$. This drop in screen potential $e_{g2}$, coupled to capacitor $C_5$ to suppressor 13 as a negative-going voltage, causes a further decrease in plate current. Since at this point in time the screen is the only other positive electrode, practically all of the cathode current is diverted to the screen, which drives its voltage $e_{g2}$ further down and forces the suppressor voltage $e_{g3}$ further negative. This action is, of course, regenerative and takes place in a few microseconds. Accordingly, screen voltage $e_{g2}$ approaches ground potential and suppressor voltage $e_{g3}$ drops sufficiently to cut-off the pentode with respect to plate current.

With plate current cut-off, plate voltage $e_p$ starts to rise. The first small fraction of this positive excursion is coupled through capacitor $C_2$ to control grid 11, sending it above ground into its conducting region. While grid 11 is conducting (its voltage being at or above ground) and the plate voltage is rising, capacitor $C_2$ charges up through the grid-cathode resistance of the pentode and plate resistor $R_p$ toward supply voltage B+, and capacitor $C_5$ discharges through resistor $R_3$. As control grid voltage $e_{g1}$ and plate voltage $e_p$ rise, plate current starts to flow, causing a drop in screen current and a rise in screen voltage $e_{g2}$, which rise is in turn coupled to suppressor grid 13 through capacitor $C_5$, and a second regeneration occurs. This causes a heavy plate current flow, but only for a very short time, since a small drop in plate voltage is coupled to the control grid through capacitor $C_2$, sending it into its negative region. With capacitor $C_2$ charged and the control grid negative, the condition is now reestablished for linear plate rundown.

Normally, transitron 26 functions as a free-running sawtooth generator, as described above. However, if at any time during the down-sweep (linear plate rundown), discriminator 22 feeds pulses to clamping circuit 24 to form a negative voltage (assuming for the moment that resistor $R_1$ of the clamping circuit has an end tied to ground), then the grid voltage $e_{g1}$ is kept from going positive because capacitor $C_2$ is prevented from discharging. Thus, transitron 26 stops sweeping (becomes locked), and performs as a D.C. amplifier to correct the repeller potential of the klystron to keep the local oscillator of the radar system properly tuned. Under this condition, the A.F.C. loop is closed and the system is locked to the incoming signal, as in the period $T_o$ to $T_a$ of FIG. 2.

In the system so far described, the action of memory-correction control circuit 25 has been omitted. The output voltage $e_o$ of transitron 26, without memory control circuit 25, would be as shown in FIG. 2. From time $T_o$ to $T_a$ pulses are present at the output of discriminator 22 at the proper pulse repetition rate, and potential $e_o$ at the plate $V_3$ scallops between pulses. At time $T_a$ these pulses, which form the signals locking the transitron out of sweep, are lost for a period longer than the time interval T, and the transitron starts to sweep at $T_a$, after one pulse interval. If the locking signal should appear before time $T_b$, locking can recur. At time $T_b$ however, the system has changed frequency far enough so that, even though locking pulses return, the loop remains broken, and the system will search one entire cycle before the loop is completed again.

The time interval $T_b$–$T_a$ is called memory time, and is dependent on only $C_1$, $R_1$ or $R_2$, after one pulse interval.

To change the memory time of the circuit so far described, $C_1$, $R_1$ or $R_2$ must be changed. However, since this would change the normal sweep period, control of the memory period is not made by adjusting these components.

While the operation explained so far has depended on the time interval T, the most desirable operation is obtained when T is determined not by the pulse interval, but by a separate circuit. Memory-control circuit 25 achieves this objective by effectively opening the path of $C_2$ to ground through $R_1$ and $R_2$, thus preventing $C_2$ from discharging, and so stopping the transitron from sweeping. It permits the correction time ($t$) to be made less than the time between pulses of the highest P.R.F., and further, causes the memory to turn on after the correction interval, the memory to last for a time interval which is longer than the time interval between pulses at the lowest P.R.F. Only at the conclusion of the memory interval is sweeping permitted to resume.

Memory-correction control circuits 25 comprises diodes $CX_1$ and $CX_2$ connected back-to-back between $R_1$ and ground, with resistor $R_3$ shunting diode $CX_2$. Monostable cathode-coupled multivibrator 28 has section $V_1$ normally cut-off and section $V_2$ normally conducting due to cathode resistor $R_5$. $V_1$ grid 29 is connected to discriminator 22 by capacitor $C_4$. Junction P of diodes $CX_1$ and $CX_2$ is connected by capacitor $C_3$ to plate 31 of tube $V_2$. The multivibrator period is determined by capacitor $C_6$, connected between plate 32 of tube $V_1$ and grid of tube $V_2$, and by resistor $R_4$, connected between grid 33 and ground.

During sweep operation of transitron $V_3$ after pulses cease, the grid voltage $e_{g1}$ is approximately −10 volts. Diode $CX_1$ is conducting, and memory-correction control circuit 25 has no effect on the overall operation of the system.

Now, when a pulse occurs at the output of discriminator 22, three things happen simultaneously in the memory-correction control circuit. They are: the positive pulse applied by capacitor $C_4$ to grid 29 of tube $V_1$ triggers multivibrator 28; the positive pulse resulting at plate 31 of tube $V_2$ is coupled to point P by capacitor $C_3$; and $CX_2$ clamps the pulse at point P to ground. This condition allows the normal clamping action of clamping circuit 24, which provides the current for stopping the sweep or for making a frequency correction.

Since the discriminator pulses are of short duration compared to their spacing, as shown in FIGURE 3, the positive potential is very quickly removed from grid 29 of tube $V_1$, so that the multivibrator period is determined by $C_6R_4$. Accordingly, the time at which point P is at ground potential is the correction time, and is regulated by $C_6R_4$. Point P must be effectively connected to ground during the correction period to obtain the proper time constant with $C_1$ for the required amount of frequency correction for each pulse. In FIGURE 3, each of the pips of $e_o$ occurring during the interval between $T_o$ and $T_a$ represents correction periods.

After the charge has leaked off capacitor $C_6$, plate 31 returns nearly to ground potential, and a negative clamping voltage of approximately −10 volts is developed at point P across $C_3$ and $R_3$ due to the clamping action of $CX_2$. When this occurs, capacitor $C_1$ does not discharge through resistor $R_1$ and transitron 26 does not sweep. As long as the voltage at point P is maintained more negative than control grid voltage $e_{g1}$, transitron 26 does not sweep and remains in "memory". This condition exists until the charge leaks off capacitor $C_3$ through resistor $R_3$ (e.g., for the time from $T_a$ to $T_b$ in FIGURE 3) when sweep action will resume or until another pulse occurs at the output of discriminator 22, to make another frequency correction. The memory time is therefore set by adjusting the time constant $C_3R_3$.

Thus it can readily be seen that the memory time and the correction interval are independent of each other and independent of the P.R.F. of the received signal. The circuit of this invention accordingly can provide a much more flexible operation in any receiver or transmitter that is swept in frequency than is possible in any previously known circuit arrangement.

The foregoing disclosure relates to a preferred embodiment of the invention. Numerous modifications or alterations may be made therein without departing from the spirit and scope of the invention set forth in the appended claims.

What is claimed is:

1. In a receiving device comprising a local oscillator, means for receiving a signal, means connected to said local oscillator and to said receiving means for mixing the output signals therefrom, and a discriminator circuit connected to said mixing means for providing output pulses: apparatus for controlling the frequency of said local oscillator including a transitron circuit comprising an electron discharge device having a control electrode, an output electrode and a first resistor connected to said control electrode, said output electrode being connected to said local oscillator; means connected between said resistor and said discriminator for clamping said pulses; a multivibrator circuit; a coupling capacitor connecting sad discriminator to sad multivibrator; a clamping circuit connected to said multivibrator; and coupling means connecting said clamping circuit to said clamping means.

2. The receiving device of claim 1 wherein said clamping means includes a second resistor having one end connected to said first resistor, a first capacitor connected between said discriminator and the junction of said first and second resistors, and a first diode connected between said junction and ground potential; wherein said clamping circuit includes a second diode, a third resistor shunting said second diode, and a third capacitor connected between said multivibrator and one end of said third resistor, the other end of said third resistor being connected to ground potential; and wherein said coupling means includes a third diode connected between said one end of said third resistor and the other end of said second resistor.

3. The receiving device of claim 2 wherein said multivibrator is a monostable cathode-coupled multivibrator including first and second electron tube, each having cathode, grid and plate electrodes; a fourth capacitor connected between the plate of said first tube and the grid of said second tube; and a fourth resistor connected between the grid and cathode of said second tube, said coupling capacitor being connected to the grid of said first tube.

4. An automatic frequency control circuit comprising a transitron circuit including an electron discharge device having a control electrode and a first resistor connected to said electrode; an input circuit; a first clamping circuit including a second resistor having one end connected to said first resistor, a first capacitor connected to the junction of said first and second resistors and having its other end coupled to said input circuit, and a first diode connected between said junction and ground potential; a multi-vibrator circuit having an output circuit; a second capacitor connecting said input circuit to said multivibrator circuit; a second clamping circuit including a second diode, a third resistor shunting said second diode, and a third capacitor connected between the output circuit of said multivibrator and one end of said second diode, the other end of said second diode being connected to ground potential; and a third diode connected between the other end of said second resistor and said one end of said second diode.

References Cited in the file of this patent

UNITED STATES PATENTS

| | | |
|---|---|---|
| 2,705,756 | Strandberg | Apr. 5, 1955 |
| 2,884,519 | Masselin | Apr. 28, 1959 |
| 2,897,449 | Larkin | July 28, 1959 |
| 3,021,424 | Morgan | Feb. 13, 1962 |

UNITED STATES PATENT OFFICE

CERTIFICATE OF CORRECTION

Patent No. 3,114,108 December 10, 1963

Merlin H. MacKenzie

It is hereby certified that error appears in the above numbered patent requiring correction and that the said Letters Patent should read as corrected below.

Column 3, line 15, for "to", first occurrence, read -- by --; column 4, line 19, for "circuits" read -- circuit --; column 5, line 23, for "sad", both occurrences, read -- said --.

Signed and sealed this 16th day of June 1964.

(SEAL)
Attest:

ERNEST W. SWIDER
Attesting Officer

EDWARD J. BRENNER
Commissioner of Patents